United States Patent
Hayashi et al.

(10) Patent No.: US 6,625,562 B2
(45) Date of Patent: Sep. 23, 2003

(54) MULTIPLE RPM INDICATING TACHOMETER FOR MOTOR VEHICLES

(75) Inventors: Toshiaki Hayashi, Uraysu (JP); Taro Ueda, Chigasaki (JP); Stephen Simula, Columbus, OH (US); Floris H.J.F. Keizer, Columbus, OH (US); Henry Shilling, Upper Arlington, OH (US); Stephanie Horwitz, Sausalito, CA (US)

(73) Assignees: COATO Workshop, Inc., Tokyo (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/976,184

(22) Filed: Oct. 12, 2001

(65) Prior Publication Data

US 2003/0074158 A1 Apr. 17, 2003

(51) Int. Cl.$^7$ .................................................. G01P 3/00
(52) U.S. Cl. ........................................ 702/145; 702/142
(58) Field of Search ................................. 702/127, 141, 702/142, 145; 324/160, 165, 166; 340/438–439, 441, 461–462

(56) References Cited

U.S. PATENT DOCUMENTS

| | | | |
|---|---|---|---|
| 4,179,938 A | | 12/1979 | Schramm |
| 5,309,139 A | * | 5/1994 | Austin .................. 340/438 |
| 6,199,027 B1 | | 3/2001 | Crunk |
| 6,215,298 B1 | * | 4/2001 | Westberg et al. .......... 702/145 |

* cited by examiner

*Primary Examiner*—Bryan Bui
(74) *Attorney, Agent, or Firm*—Porter, Wright, Morris & Arthur, LLP

(57) ABSTRACT

A tachometer for a motor vehicle includes a controller adapted to provide a current rpm value at a current gear which is engaged and at least one predicted rpm value at a different gear which is not currently engaged. A display is operatively connected to the controller and is adapted to produce an observable indication of the current rpm value and an observable indication of the predicted rpm value. By displaying predicted rpm values for different gears, the motor vehicle operator can easily see the effect of shifting gears so that the gears can be shifted in a manner to obtain optimum performance of the motor vehicle. The display preferably produces an observable indication of the current gear number near the current rpm value and an observable indication of the different gear number near the observable indication of the predicted rpm value.

26 Claims, 10 Drawing Sheets

US 6,625,562 B2

MULTIPLE RPM INDICATING TACHOMETER FOR MOTOR VEHICLES

CROSS-REFERENCE TO RELATED APPLICATIONS

Not applicable.

STATEMENT REGARDING FEDERALLY SPONSORED RESEARCH

Not Applicable

REFERENCE TO MICROFICHE APPENDIX

Not Applicable

1. Field of the Invention

The present invention generally relates to tachometers and, more particularly, to tachometers for engines of motor vehicles having transmissions with a plurality of gears.

2. Background of the Invention

Typically, engine speed is indicated by shaft rotation in revolutions-per-minute (rpm). During operation of a motor vehicle it is common to measure current engine rpm with vehicle instruments and to display the current engine rpm to the operator with a tachometer. The motor vehicle operator can read the display and determine whether or not to shift gears and/or to adjust the speed of the motor vehicle. The operator should shift gears at appropriate engine speeds to extract maximum power from the engine and obtain maximum vehicle speed. Up-shifting, that is, shifting to a higher transmission gear, too early can result in a loss of torque and resulting loss of vehicle acceleration or even engine stalling. Up-shifting too late can result in over-revving the engine, that is, reaching an engine speed greater than the maximum recommended engine speed, can cause damage to the engine valve train. Down shifting, that is, shifting to a lower transmission gear, at an inappropriate time can result in over-revving the engine, "redlining" the engine, an/or even "blowing" the engine.

Often a motor vehicle's engine performance is measured in a laboratory on a dynamometer or dynamo which measures engine torque, speed and power characteristics. In this way, peak torque and peak power values can be determined so that the operator can memorize and use them as an aid to obtain optimum gear shifting. Also, many operators memorize the sound of the engine as an aid to obtain optimum gear shifting.

While motor vehicle operators may be able reasonably shift at appropriate times, it is impossible to precisely know the effect of every gear shift operation under all conditions. The situation is further complicated when engines have variable controls because the peak torque value and the peak power value can change. With variable controls, it is impossible for a driver to even know the peak torque value and the peak power value under all conditions. Accordingly, there is a need in the art for a tachometer which enables the operator to shift gears in a manner which obtains improved motor vehicle performance.

SUMMARY OF THE INVENTION

The present invention provides a tachometer which overcomes at least some of the above-noted problems of the related art. According to the present invention, a tachometer comprises, in combination, a display adapted to produce an observable indication of a current rpm value for a current gear and an observable indication of at least one predicted rpm value for a different gear. The tachometer preferably includes a controller operably connected to the display and adapted to provide signals representing the current rpm value for the current gear and the at least one predicted rpm value for the different gear. In a preferred embodiment, the controller is adapted to calculate the at least one predicted rpm value with stored equations.

According to another aspect of the present invention a motor vehicle comprises, in combination, a transmission having a current gear which is engaged and at least one different gear which is not currently engaged and a tachometer. The tachometer includes a display adapted to produce an observable indication of a current rpm value for the current gear and an observable indication of a predicted rpm value for the different gear. The tachometer preferably further includes a controller operably connected to the display and adapted to provide signals representing the current rpm value for the current gear and the predicted rpm value for the different gear. In a preferred embodiment, the controller is adapted to calculate the predicted rpm value with stored equations.

According to yet another aspect of the present invention a method of providing rpm information comprises the steps of, in combination, producing an observable indication of a current rpm value for a current gear with a display and producing an observable indication of at least one predicted rpm value for a different gear with the display. The method preferably further comprises the steps of providing a signal representing the current rpm value for the current gear with a controller operably connected to the display and providing a signal representing the at least one predicted rpm value for the different gear with the controller. A preferred method further comprises the step of calculating the at least one predicted rpm value with stored equations of the controller.

From the foregoing disclosure and the following more detailed description of various preferred embodiments it will be apparent to those skilled in the art that the present invention provides a significant advance in the technology and art of motor vehicle tachometers. Particularly significant in this regard is the potential the invention affords for providing a high quality, reliable, user-friendly device which enables a motor vehicle to operate at or near peak performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
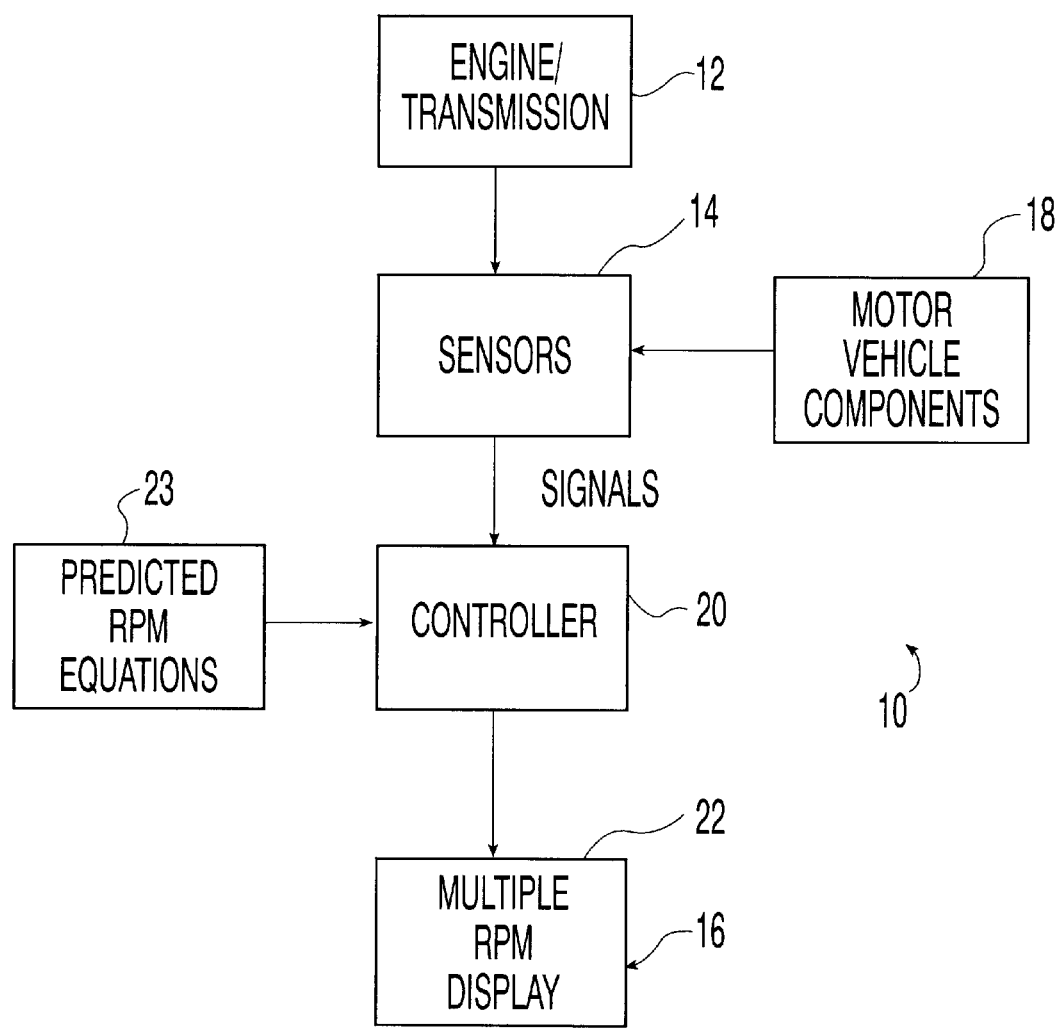
FIG. 1 is a functional block diagram showing a motor vehicle having a tachometer according to the present invention.

It should be understood that the appended drawings are not necessarily to scale, presenting a somewhat simplified representation of various preferred features illustrative of the basic principles of the invention. The specific design features of a tachometer as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tachometer illustrated in the drawings. In general, up or upward refers to an upward direction within the plane of the paper in FIGS. 2A to 8 and down or downward refers to a downward direction within the plane of the paper in FIGS. 2A to 8. Also in general, fore or forward refers to a direction toward the front of the vehicle, that is, into the plane of the paper in FIGS. 2A to 8 and aft or rearward refers to a direction toward the rear of the vehicle, that is, out of the plane of the paper in FIGS. 2A to 8.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved tachometer disclosed herein. The following detailed discussion of various alternative and preferred embodiments will illustrate the general principles of the invention with reference to an engine tachometer for a motor vehicle such as, for example, a high performance automobile or race car or truck. Other embodiments suitable for other applications will be apparent to those skilled in the art given the benefit of this disclosure.

Referring now to the drawings, FIG. 1 schematically illustrates a motor vehicle 10 according to a preferred embodiment of the present invention. The motor vehicle 10 includes an engine and transmission 12, instruments or sensors 14 for detecting current conditions of the engine and transmission 12, and a tachometer 16 which determines and indicates multiple rpm values to the operator of the motor vehicle 10. The engine and transmission 12 can be of any suitable type as known to those skilled in the art. The transmission has a plurality of gears which can be engaged including a current gear which is engaged and a plurality of different gears which are not currently engaged but which can be engaged. The sensors 14 are operatively connected to the engine and transmission 12 and other components 18 of the motor vehicle 10 to obtain information or data signals indicating the current operating conditions of the motor vehicle 10. The sensors 14 obtain information regarding the current engine rpm. For example, the sensors 14 can sense sparks emitted by the running engine 12 which are used to determine the current engine rpm or any other suitable information to determine the current engine rpm. It is noted that alternatively, the current engine rpm can be directly provided to the tachometer 16. The sensors 12 also obtain information regarding the gear the transmission 12 is currently operating in, that is, the current gear. The sensors 14 preferably provide, either directly or information to determine, the current speed of the motor vehicle 10 as well as any other desired current condition of the motor vehicle 10.

The tachometer 16 includes an rpm CPU or controller 20 for determining the current engine rpm value and/or predicted engine rpm values and a display 22 for providing a visual or observable indication of the current engine rpm value and a visual or observable indication of the predicted rpm values. The controller 20 can be of any suitable type having memory means and processing means and is operably connected to the sensors 14 to receive signals from the sensors 14. The controller 20 can be adapted to receive current engine rpm values and provide a suitable signal the display 22 indicating the current engine rpm or adapted to receive information such as engine sparks from the sensors 14, determine the current engine rpm, and provide a suitable signal the display 22 indicating the current engine rpm.

The controller 20 is also adapted to receive signals indicating the current gear of the transmission 12 and the current vehicle speed. With this information and the current rpm, the controller 20 determines predicted engine rpm values for transmission gears higher and/or lower than the current gear and which are not currently in use. These predicted rpm values indicate or predict what the engine rpm would be if the transmission was currently engaged in a gear different than the current gear so that the operator can see the predicted effect of an immediate gear shift to a different gear. Equations 23 for calculating the predicted engine rpm values are preferably provided to the controller 20 by storing the equations 23 in the memory means of the controller 20 and/or storing the equations 23 as part of embedded software in the controller 20. The predicted rpm equations 23 are preferably developed through dynamometer testing of the engine type or the specific engine 12 but can alternatively be developed by other suitable testing means or theoretically. The controller 20 is adapted to send suitable signals indicating the predicted engine rpm values for the different gears which are not currently in use.

The display 22 is operably connected to the controller 20 to receive the signals indicating the current rpm value and the predicted rpm values and is adapted to display a visual or observable indication of the current rpm value and the predicted rpm values to the motor vehicle operator. The display can be of any suitable type such as for example, a CRT screen, an LED screen, a LCD screen, an analog or digital meter or gauge, or the like which can suitably display digital or analog information. The observable indication can also be of any suitable type such as an analog indication like a bar graph or movable needle with scale divisions or a digital indication such as a number.

Figure 2A:
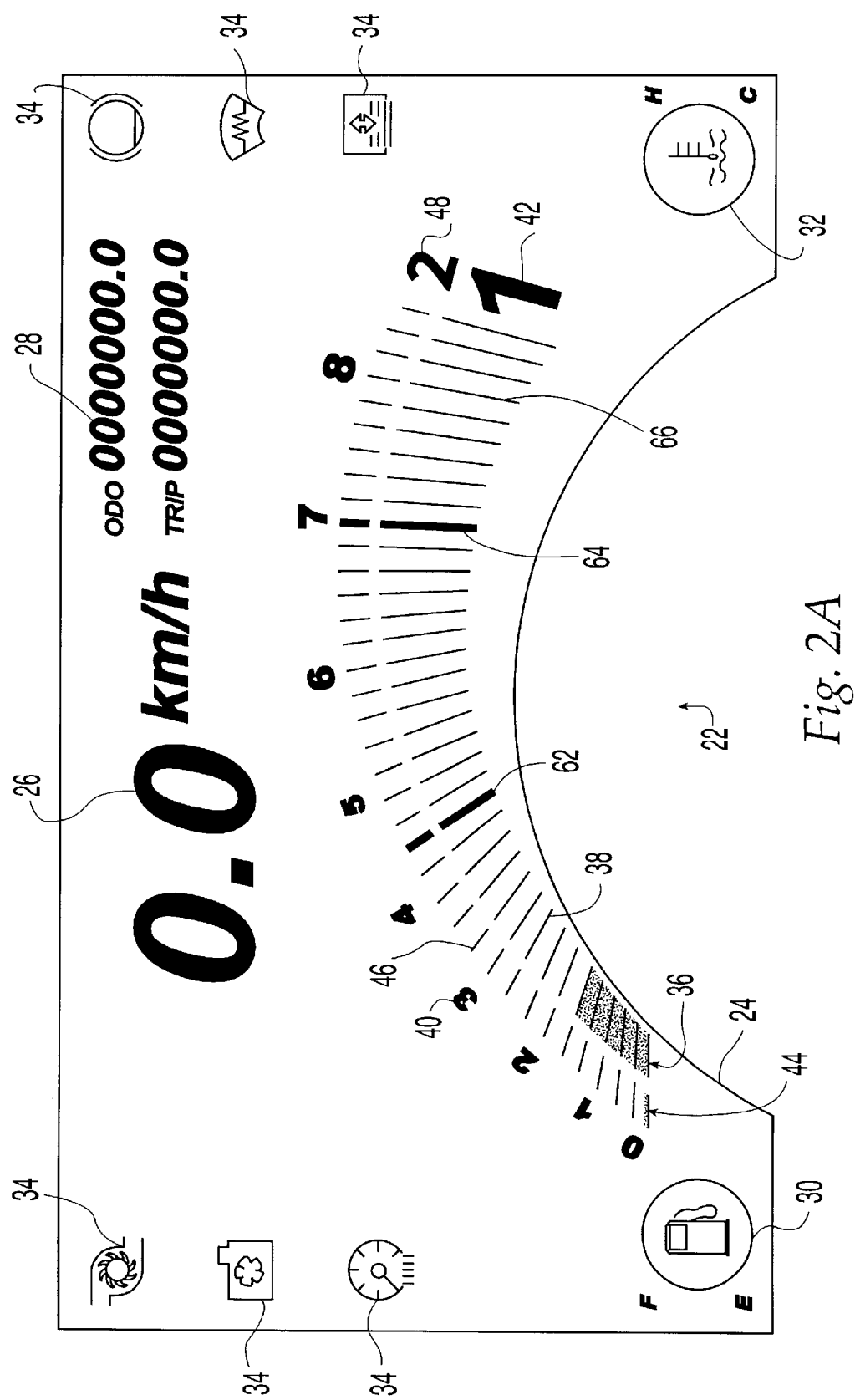
FIGS. 2A to 2C are front elevational views of a display of the tachometer of FIG. 1 wherein the motor vehicle transmission is in first gear, fourth gear and sixth gear respectively.
Figure 2B:
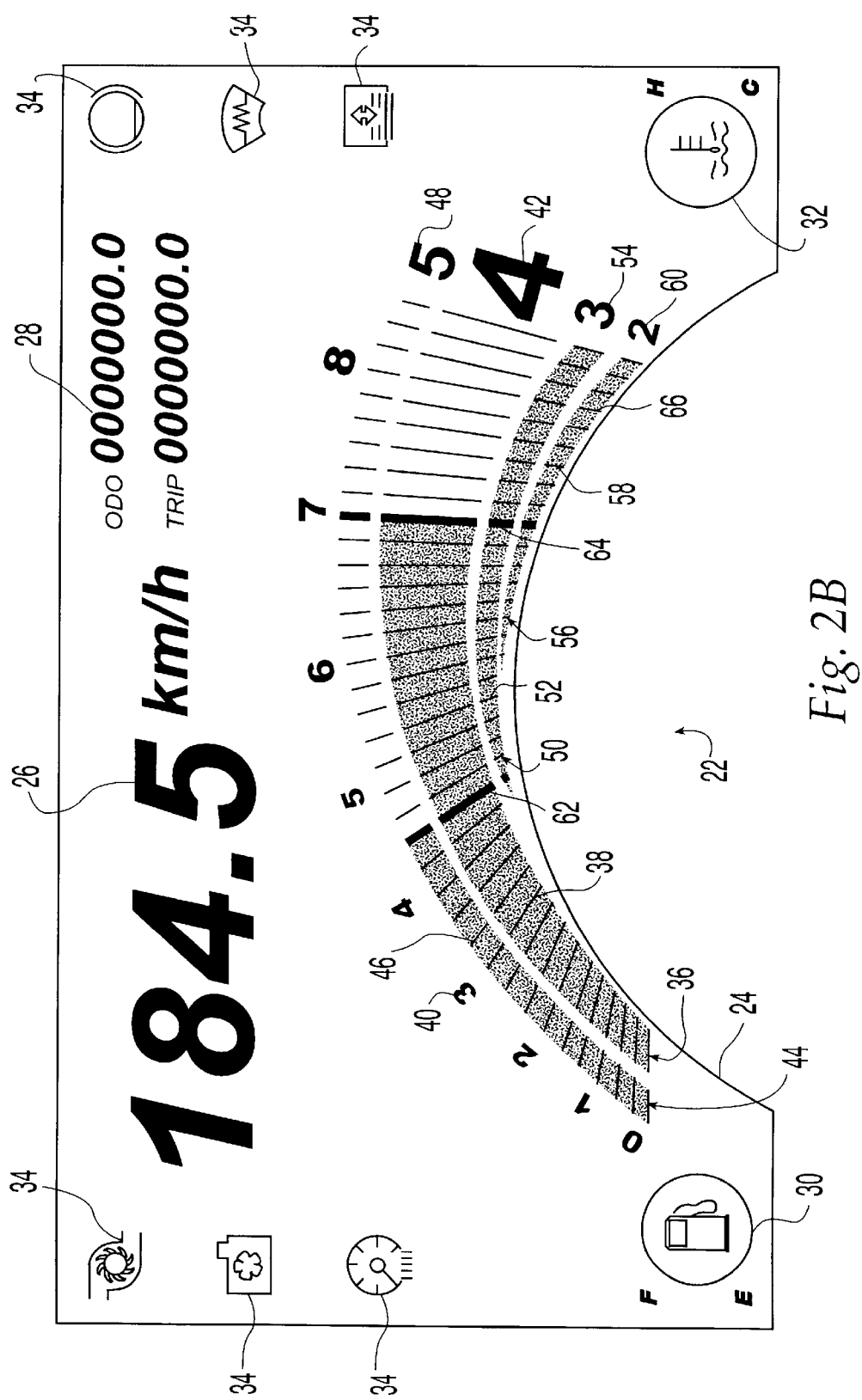
Figure 2C:
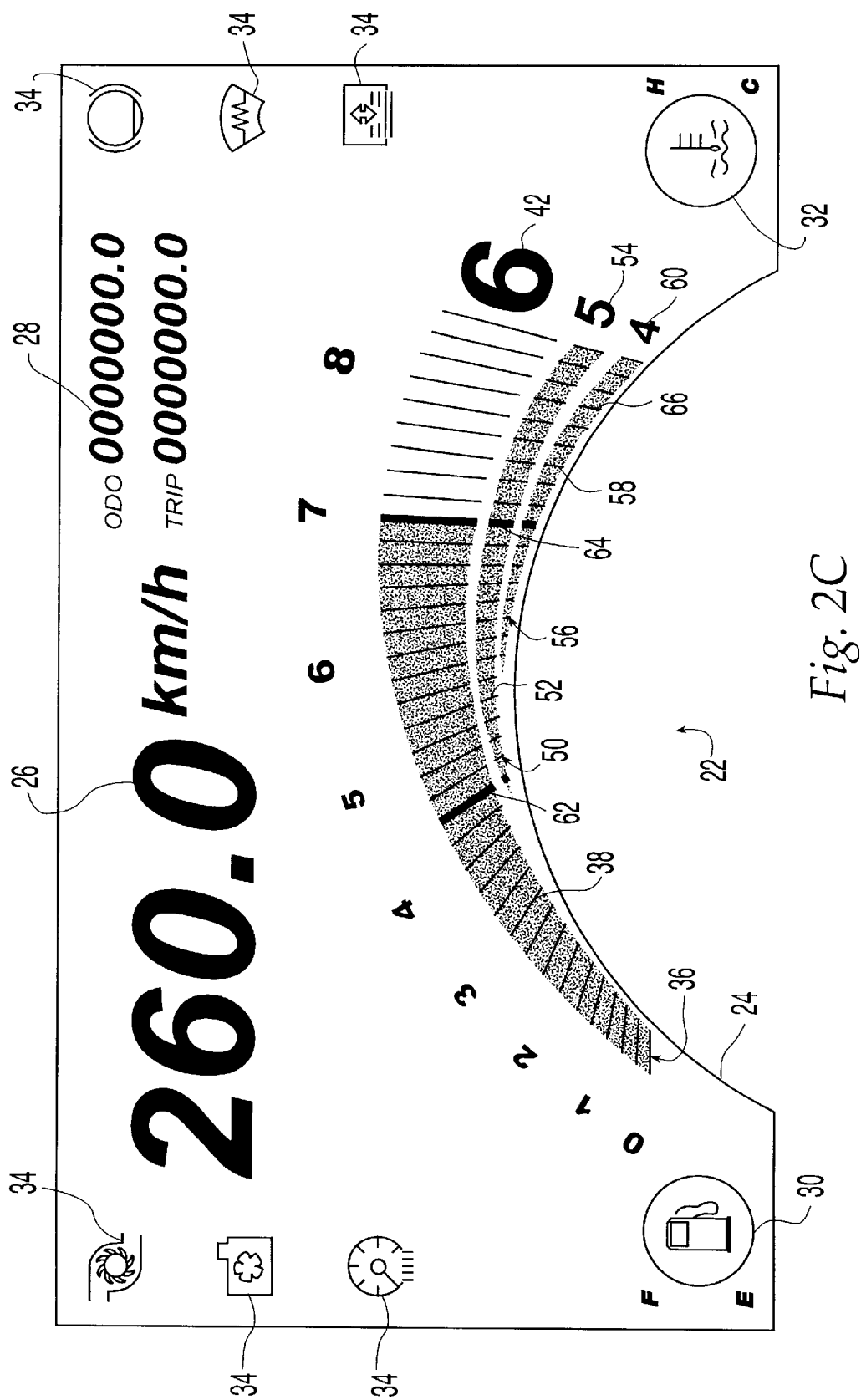

FIGS. 2A to 2C illustrate a preferred display 22 which is in the form of an LCD screen. The display 22 is generally rectangular shaped but has an arcuate recess 24 formed at the lower side. The recess 24 is sized and shaped such that the display 22 can be mounted on the steering column of the motor vehicle 10 with the display extending partially around the circumference of the steering column. It is noted that the display 22 can alternatively be adapted for mounting at other locations such as at the motor vehicle dash. The illustrated display 22 includes a speedometer 26 providing an observable indication of the motor vehicle speed, an odometer 28 providing an observable indication of the travel distance of the motor vehicle 10, a fuel gauge 30 providing an observable indication of the amount of fuel in the motor vehicle fuel tank, a temperature gauge 32 providing an observable indication of an engine temperature, and a plurality of other gauges 34 providing visual indications of various current conditions of the motor vehicle 10. Preferably, the other gauges 34 are initially illuminated or shown for only a brief period of time at motor vehicle start up to show the operator that they are functioning properly and then they are not shown again unless individual ones of the other gauges 34 are needed to convey a particular current condition of the motor vehicle 10 to the operator.

As best shown in FIG. 2A, the visual indication of the current rpm value is an analog gauge in the form of an arc-shaped bar graph 36. The illustrated bar graph 36 increases in height from a first or low rpm end at the left side of the display 22 to a second or high rpm end at the right side of the display 22. It is noted that the graph 36 can alternatively have an otherwise varying or a substantially constant height within the scope of the present invention. The illustrated bar graph 36 begins near the edge of the radius 24 at its low rpm end but increases in radius, compared to the constant radius recess 24, so that it is spaced further from the edge of the recess 24 at its high rpm end than at its low rpm end. The bar graph 36 includes a plurality of scale divisions 38 in the form of spaced-apart lines. The bar graph 36 also includes scale numbers 40 associated with the scale divisions 38 to indicate the magnitude of the scale divisions 38. The illustrated bar graph 36 has scale divisions 38 indicating engine speed from 0 to about 8500 rpm and scale numbers 40 from zero to eight representing from 0 to 8000 rpm. A visual indication of the current gear, in the form of a current gear number 42, is located at the high rpm end of the bar graph 36. In FIG. 2A, the current gear is first gear so the current gear number 42 is the number "1". The current gear number 42 preferably has a height substantially the same as the height of the bar graph 36.

The visual indication of the predicted rpm value for the first up-shift gear, second gear in FIG. 2A, is also an analog gauge in the form of an arc-shaped bar graph 44. The illustrated bar graph 44 has a substantially constant height from a first or low rpm end at the left side of the display 22 to a second or high rpm end at the right side of the display 22. It is noted that the graph 44 can alternatively have an increasing or otherwise varying height within the scope of the present invention. The height is preferably smaller than the height of the graph 36 of the current rpm. The illustrated bar graph 44. The graph 44 for the first up-shift gear is located directly above and adjacent the graph 36 for the current gear. The graph 44 includes a plurality of scale divisions 46 in the form of spaced-apart lines which are preferably separated from but extensions of the scale divisions 38 of the graph 36 for the current gear. The bar graph 44 for the first up-shift gear utilizes the same scale numbers 40 as the graph 36 for the current gear. A visual indication of the first up-shift gear, in the form of a gear number 48, is located at the high rpm end of the bar graph 44. In FIG. 2A, the first up-shift gear is second gear so the gear number "2" is displayed. The first up-shift gear number 48 preferably has a height substantially the same as the height of the bar graph 44. Therefore, the first up-shift gear number 48 is relatively smaller than the current gear number 42.

As best shown in FIGS. 2B and 2C, the visual indication of the predicted rpm value for the first down-shift gear, third gear in FIG. 2B and fifth gear in FIG. 2C, is also an analog gauge in the form of an arc-shaped bar graph 50. The illustrated bar graph 50 increases in height from a first or low rpm end near the center of the display 22 to a second or high rpm end at the right side of the display. It is noted that the graph 50 can alternatively have an otherwise varying or a substantially constant height within the scope of the present invention. The height is preferably smaller than the height of the graph 36 of the current rpm and substantially the same as the height of the graph 44 for the first up-shift gear at the high rpm end. The graph 50 for the first down-shift gear is located directly below and adjacent the graph 36 for the current gear. The graph 50 includes a plurality of scale divisions 52 in the form of spaced-apart lines which are preferably separated from but extensions of the scale divisions 38 of the graph 36 for the current gear. The graph 50 for the first down-shift gear utilizes the same scale numbers 40 as the graph 36 for the current gear. A visual indication of the first down-shift gear, in the form of a gear number 54, is located at the high rpm end of the bar graph 50. In FIG. 2B, the first down-shift gear is third gear so the gear number "3" is displayed and In FIG. 2C, the first down-shift gear is fifth gear so the gear number "5" is displayed. The first down-shift gear number 54 preferably has a height substantially the same as the height of the bar graph 50. Therefore, the first down-shift gear number 54 is relatively smaller than the current gear number 42 and substantially the same as the first up-shift gear number 48.

As best shown in FIGS. 2B and 2C, the visual indication of the predicted rpm value for the second down-shift gear, second gear in FIG. 2B and fourth gear in FIG. 2C, is also an analog gauge in the form of an arc-shaped bar graph 56. The illustrated bar graph 56 increases in height from a first or low rpm end near the center of the display 22 to a second or high rpm end at the right side of the display. It is noted that the graph 56 can alternatively have an otherwise varying or a substantially constant height within the scope of the present invention. The height is preferably smaller than the height of the graph 36 of the current rpm and smaller than the height of the graphs 44, 50 for the first up-shift gear and the first down-shift gear at the high rpm end. The graph 56 for the second down-shift gear is located directly below and adjacent the graph 50 for the first down-shift gear. The graph 56 includes a plurality of scale divisions 58 in the form of spaced-apart lines which are preferably separated from but extensions of the scale divisions 52 of the graph 50 for the first down-shift gear. The graph 56 for the second down-shift gear utilizes the same scale numbers 40 so that the scale numbers 40 are common to all of the graphs 36, 44, 50, 56. A visual indication of the second down-shift gear, in the form of a gear number 60, is located at the high rpm end of the bar graph 56. In FIG. 2B, the second down-shift gear is second gear so the gear number "2" is displayed and In FIG. 2C, the second down-shift gear is fourth gear so the gear number "4" is displayed. The second down-shift gear number 60 preferably has a height substantially the same as the height of the bar graph 56. Therefore, the second down-shift gear number 60 is relatively smaller than the current gear number 42, the first up-shift gear number 48, and the first down-shift gear number 54 so that the operator can quickly distinguish the gear numbers. When multiple gear numbers are displayed, the size of the gear numbers preferably decreases as the gears get farther from the current gear. It is noted that the current gear number 42 is preferably of a color that is different than the other gear numbers so that the current gear number 42 is even more quickly identifiable by the operator. In the illustrated embodiment, the current gear number 42 is white while the other gear numbers 48, 54, 60 are orange.

The graphs 36, 44, 50, 56 are preferably provided with a visual indication of the peak-torque rpm value for the engine 12 and the peak-power rpm value for the engine 12. The visual indication in the illustrated graphs 36, 44, 50, 56 are markings 62, 64 at the appropriate scale divisions 38, 46, 52, 58. In the illustrated embodiment, the peak torque value is located at about 4400 rpm and the peak power value is located at about 7000 rpm. It is noted that for other motor vehicles the peak torque and the peak power values may each be higher or lower. The markings are preferably in a different color than the scale divisions so that they are easily and quickly identifiable. In the illustrated embodiment, the scale divisions are blue and the peak markings are orange. It is noted that the illustrated markings 62, 64 are also much wider, preferably fading out in each direction, than the scale divisions 38, 46, 52, 58 so that the markings 62, 64 are even more quickly identifiable by the operator.

Figure 3A:
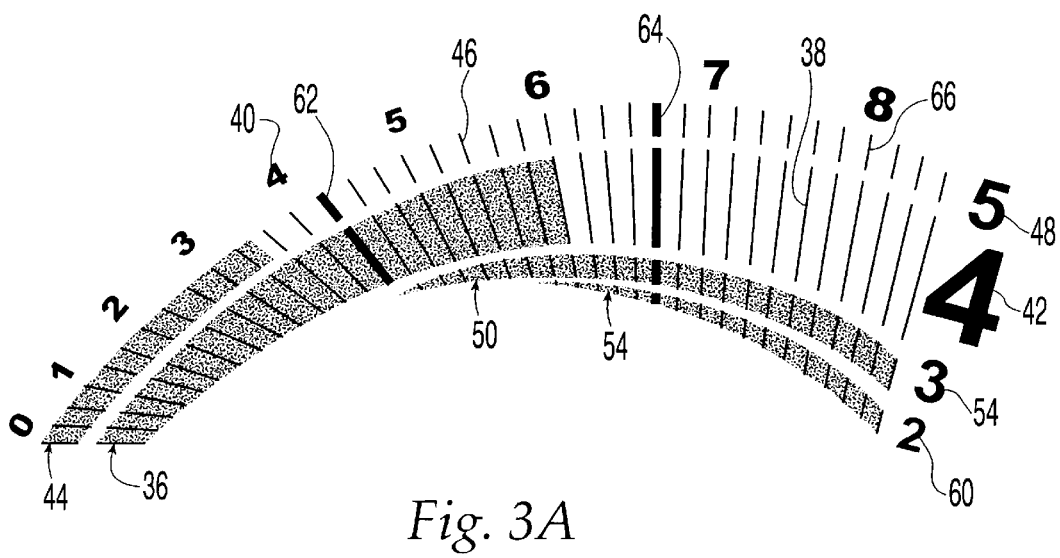
FIGS. 3A and 3B are a front elevational views showing a portion of the display of FIGS. 2A to 2C according to a variation of the present invention wherein displayed peak torque and peak power values change during operation of the motor vehicle in a current transmission gear.
Figure 3B:
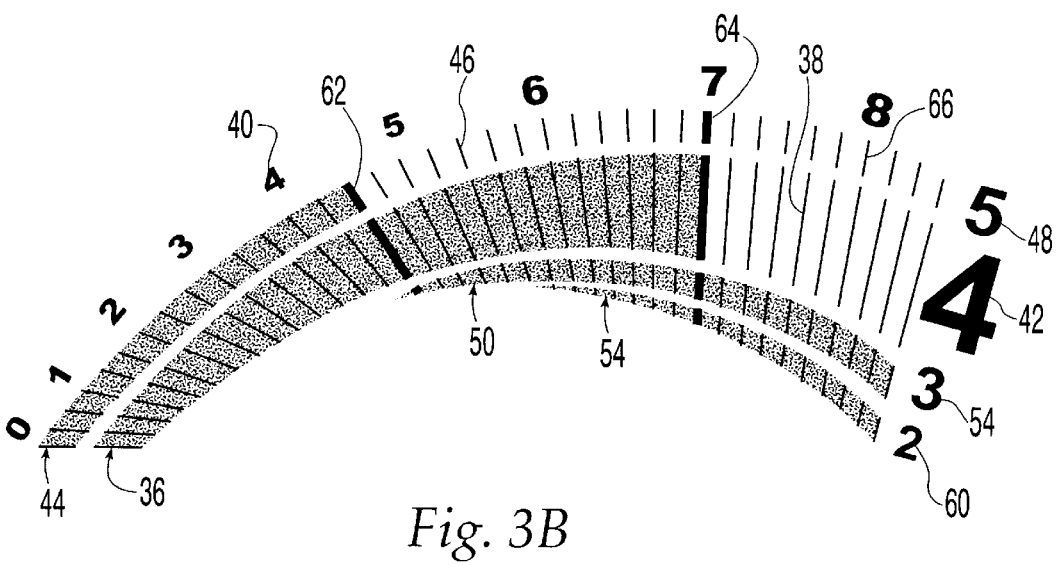
Figure 4A:
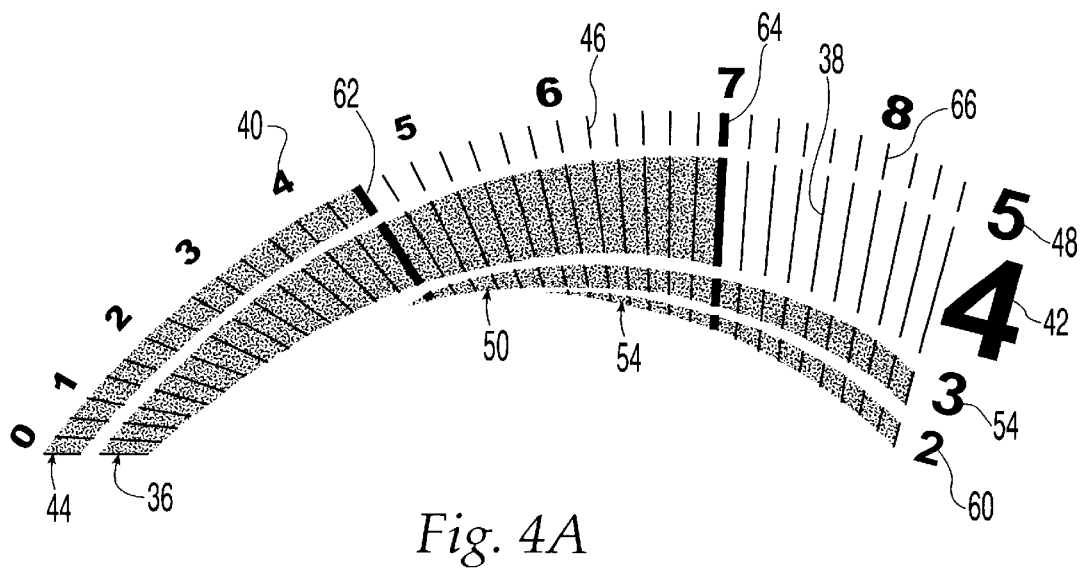
FIGS. 4A and 4B are a front elevational views showing a portion of the display of FIGS. 2A to 2C according to another variation of the present invention wherein displayed peak torque and peak power values change during operation of the motor vehicle when the transmission gear is changed.
Figure 4B:
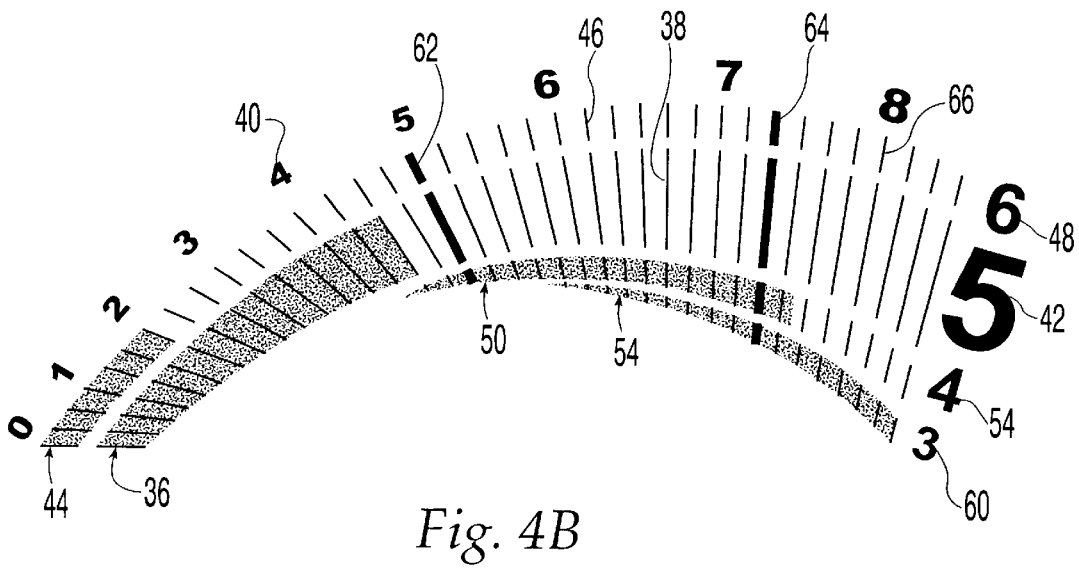

The peak-torque rpm value 62 and the peak-power rpm value 64 of the embodiment illustrated in FIGS. 2A to 2C are displayed as fixed values throughout operation of the motor vehicle 10 both while the transmission is in a current gear and when the transmission changes to a different gear. Alternatively, the values 62, 64 can change during operation of the motor vehicle 10 such as, for example, when variable controls are utilized. As shown in FIGS. 3A and 3B, the values 62, 64 can vary during operation of the motor vehicle 10 while the transmission is in a particular current gear. As shown in FIGS. 4A and 4B, the values 62, 64 can also change when the transmission changes from the current gear to a different gear.

As best shown in FIGS. 2A to 2C, the scale divisions 38, 46, 52, 58 of the illustrated embodiment are of a different, unique color at rpm values above a maximum recommended or "redline" rpm value 66 of the engine 12. The illustrated redline rpm value 66 is about 8000 rpm and the illustrated scale divisions above the redline rpm value 66 of 8000 rpm are red. It is noted that for other motor vehicles the redline rpm value 66 may each be higher or lower than 8000 rpm. It is also noted that the scale divisions between the peak-power rpm value 64 and the redline rpm value 66 are of yet another different, unique color. The illustrated scale divisions 38, 46, 52, 58 between the illustrated peak-power rpm value 64 of about 7000 rpm and the illustrated redline rpm value 66 of about 8000 rpm are yellow. It is noted that other colors can be used for the various scale divisions 38, 46, 52, 58 within the scope of the present invention.

The respective rpm values are preferably indicated on the graphs 36, 44, 50, 56 by coloring, illuminating, or otherwise differentiating the entire area of the graph below the indicated rpm value. As shown in FIG. 2A, when the current rpm is about 1500 rpm all of the area below the 1500 rpm indicator is displayed in a different color. In the illustrated embodiment the area is displayed in green rather than the normal blue. The color of the differentiated or colored area preferably changes, however, when the rpm value is above the peak-power rpm value 64 or the redline rpm value 66. In the illustrated embodiment the green colored area becomes yellow as the rpm value passes the peak-power rpm value 64 and becomes red as the rpm value passes the redline rpm value 66 (see the first and second down-shift gears in FIGS. 2B and 2C). It is noted that the current rpm graph 36 preferably highlights the current rpm value by having the rpm value highlighted by a line in a different color, preferably the same color as the current gear number 42, so that it is easily and quickly identifiable by the operator. In the illustrated embodiment they are each white.

As best shown in FIG. 2A, when the motor vehicle 10 is at rest with the engine idling and the transmission 12 in first gear, the current gear is first gear and the number "1" is displayed as the current gear number 42. The current rpm value of about 1500 rpm is displayed by coloring the graph 36 at and below the scale divisions 38 indicating 1500 rpm. The first up-shift gear is second gear and the number "2" is displayed as the first up-shift gear number 48. The predicted rpm value of about 200 rpm for second gear, the first up-shift gear, is displayed by coloring the graph 44 at and below the scale divisions 46 indicating 200 rpm. It is noted that while the illustrated embodiment displays rpm information relating to only one up-shift gear, rpm information can alternatively be displayed for more than one up-shift gear or no up-shift gears. The down-shift gear number 54, 60 are not displayed because the current gear is first gear and no down-shift gears are available. As a result, no predicted rpm values are displayed for first and second down-shift gear. It is noted that the current rpm graph 36 and the current gear number 42 are also preferably illuminated brighter than the predicted rpm graphs 44, 50, 56 and gear numbers 48, 54, 60.

As best shown in FIG. 2B, after the operator has shifted through the transmission gears to fourth gear and the motor vehicle 10 is traveling at a speed of 184.5 km/h, the current gear is fourth gear and the number "4" is displayed as the current gear number 42. The current rpm value of about 7000 rpm is displayed by illuminating the graph 36 at and below the scale divisions 38 indicating 7000 rpm. The first up-shift gear is fifth gear and the number "5" is displayed as the first up-shift gear number 48. The predicted rpm value of about 4500 rpm for fifth gear, the first up-shift gear, is displayed by illuminating the graph 44 at and below the scale divisions 46 indicating 4500 rpm. It is noted that while the illustrated embodiment displays rpm information relating to only one up-shift gear, rpm information can alternatively be displayed for more than one up-shift gear or no up-shift gears. The first and second down-shift gears are third and second respectively and the numbers "3" and "2" are displayed. The predicted rpm values for third and second gears, the first and second down-shift gears respectively, are off the scale and thus the entire graphs 50, 56 are illuminated. Because the predicted rpm values for third gear and second gear are above the redline rpm value 66, the graphs 50, 56 are colored in red. It is noted that while the illustrated embodiment displays rpm information relating to two down-shift gears, rpm information can alternatively be displayed for more than two down-shift gears, one down-shift gear, or no down-shift gears. It is apparent from viewing FIG. 2B, that the operator can easily and quickly ascertain from viewing the display 22 that the current rpm in fourth gear is at about the peak-power rpm value, 64 an up-shift to fifth gear would cause the rpm to drop to about the peak-torque rpm value 62, and a down-shift to either third gear or second gear would cause the rpm to increase to above the redline rpm value 66 and possibly cause damage to the engine 12.

As best shown in FIG. 2C, after the operator has shifted through the transmission gears to sixth gear and the motor vehicle 10 is traveling at a speed of 260.0 km/h, the current gear is sixth gear and the number "6" is displayed as the current gear. The current rpm value of about 7000 rpm is displayed by illuminating the graph at and below the scale divisions indicating 7000 rpm. The first up-shift gear number 48 is not displayed because the current gear is sixth gear and the transmission is a six-gear transmission so no up-shift gears are available. As a result, no predicted rpm values are displayed for any up-shift gears. It is noted that while the illustrated embodiment utilizes a six-gear transmission, transmissions of less than or more than six-gears can be utilized. The first and second down-shift gears are fifth and fourth gears respectively and the numbers "5" and "4" are displayed. The predicted rpm values for fifth and sixth gears, the first and second down-shift gears respectively, are off the scale and thus the entire graphs 50, 56 are illuminated. Because the predicted rpm values for fifth gear and fourth gear are above the redline rpm value 66, the graphs 50, 56 are illuminated in red. It is noted that while the illustrated embodiment displays rpm information relating to two down-shift gears, rpm information can alternatively be displayed for more than two down-shift gears, one down-shift gear, or no down-shift gears. It is apparent from viewing FIG. 2C, that the operator can easily and quickly ascertain from viewing the display 22 that the current rpm in sixth gear is at about the peak-power rpm value 64, an up shift gear is not available, and a down-shift to either fifth gear or fourth gear would cause the rpm to increase to above the redline rpm value 66 and possibly cause damage to the engine 12.

Figure 5:
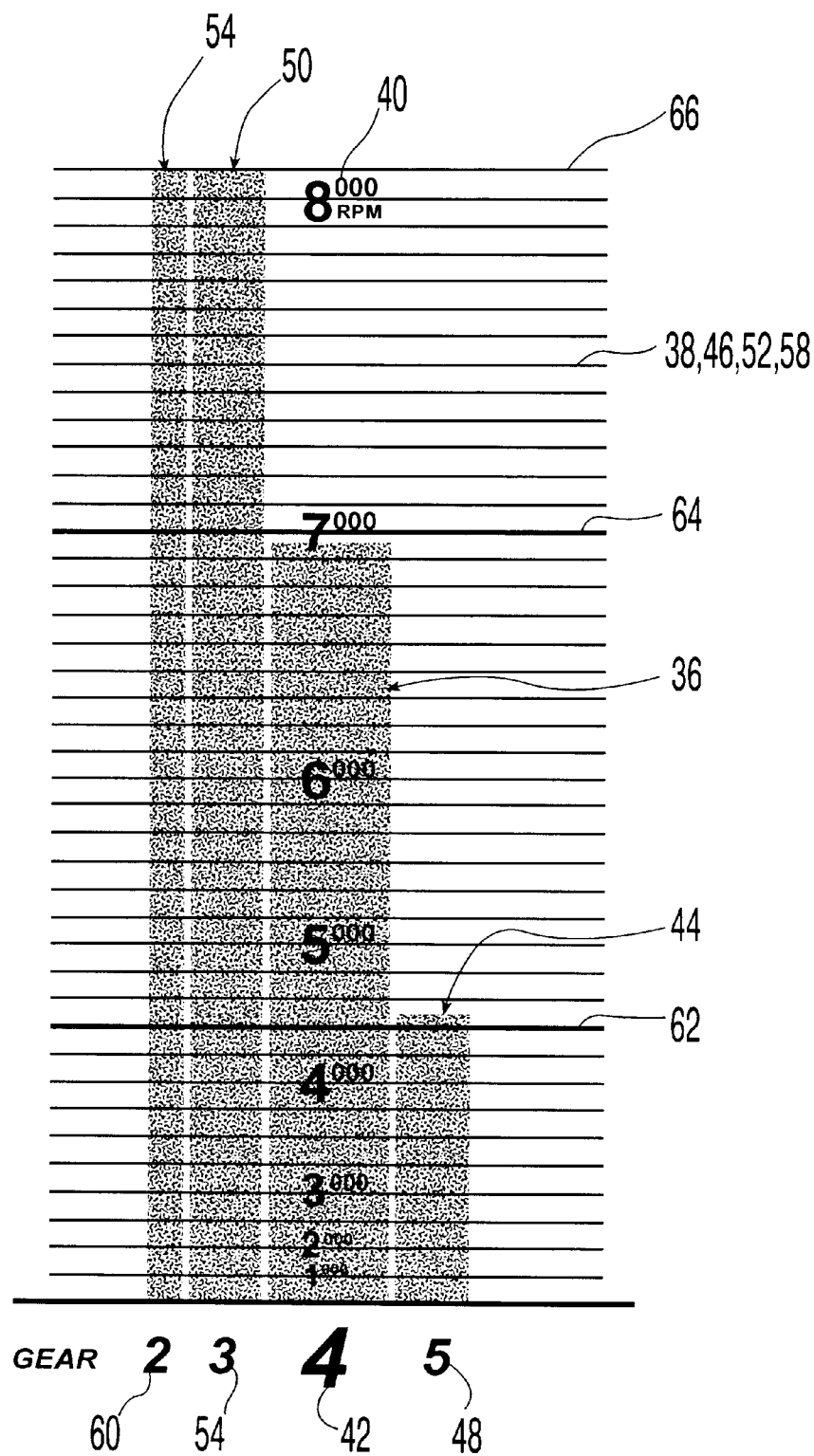
FIG. 5 is a front elevational view of the display of the tachometer of FIG. 1 according to a second embodiment of the present invention wherein the motor vehicle transmission is in fourth gear.

FIG. 5 illustrates a display 22 according to a second embodiment of the present invention which is substantially the same as the first embodiment except that vertical linear bar graphs are utilized. It is noted that like reference numbers are utilized for like structure. The current rpm graph 36 is a vertical linear bar graph with the gear number 42 located below the bottom or low rpm end of the graph 36. The first up-shift rpm graph 44 is a vertical linear bar graph located adjacent to and to the right of the current rpm graph 36 and has the gear number 48 located below the bottom or low rpm end of the graph 44. The first down-shift rpm graph 50 is a vertical linear bar graph located adjacent to and to the left of the current rpm graph 36 and has the gear number 54 located below the bottom or low rpm end of the graph 50. The second down-shift rpm graph 56 is a vertical linear bar graph located adjacent to and to the left of the first down-shift rpm graph 50 and has the gear number 60 located below the bottom or low rpm end of the graph 50. The scale divisions 38, 46, 52, 58 are preferably connected as continuous horizontal lines. It is noted that while a single up-shift rpm graph 44 and two down-shift rpm graphs 50, 56 are utilized in the illustrated embodiment, lesser or greater numbers of each can alternatively be utilized within the scope of the present invention.

Figure 6:
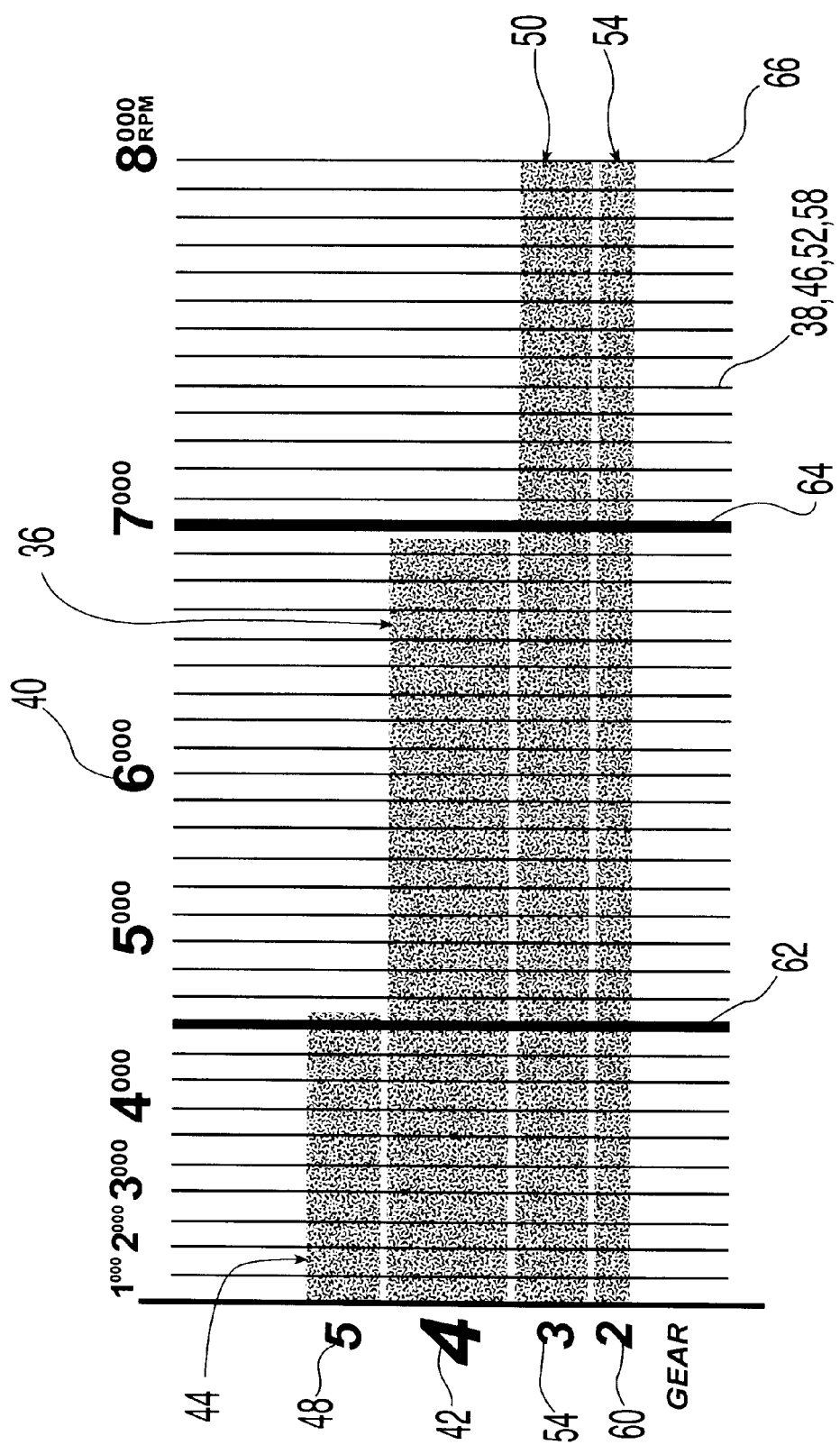
FIG. 6 is a front elevational view of the display of the tachometer of FIG. 1 according to a third embodiment of the present invention wherein the motor vehicle transmission is in fourth gear.

FIG. 6 illustrates a display 22 according to a third embodiment of the present invention which is substantially the same as the first and second embodiments except that horizontal linear bar graphs are utilized. It is noted that like reference numbers are utilized for like structure. The current rpm graph 36 is a horizontal linear bar graph with the gear number 42 located to the left or at the low rpm end of the graph 36. The first up-shift rpm graph 44 is a horizontal linear bar graph located adjacent to and above the current rpm graph 36 and has the gear number 48 located to the left or at the low rpm end of the graph 44. The first down-shift rpm graph 50 is a horizontal linear bar graph located adjacent to and below the current rpm graph 36 and has the gear number 54 located to the left or at the low rpm end of the graph 50. The second down-shift rpm graph 56 is a horizontal linear bar graph located adjacent to and below the first down-shift rpm graph 50 and has the gear number 60 located to the left or at low rpm end of the graph 50. The scale divisions 38, 46, 52, 58 are preferably connected as continuous and common vertical lines. It is noted that while a single up-shift rpm graph 44 and two down-shift rpm graphs 50, 56 are utilized in the illustrated embodiment, lesser or greater numbers of each can alternatively be utilized within the scope of the present invention.

Figure 7:
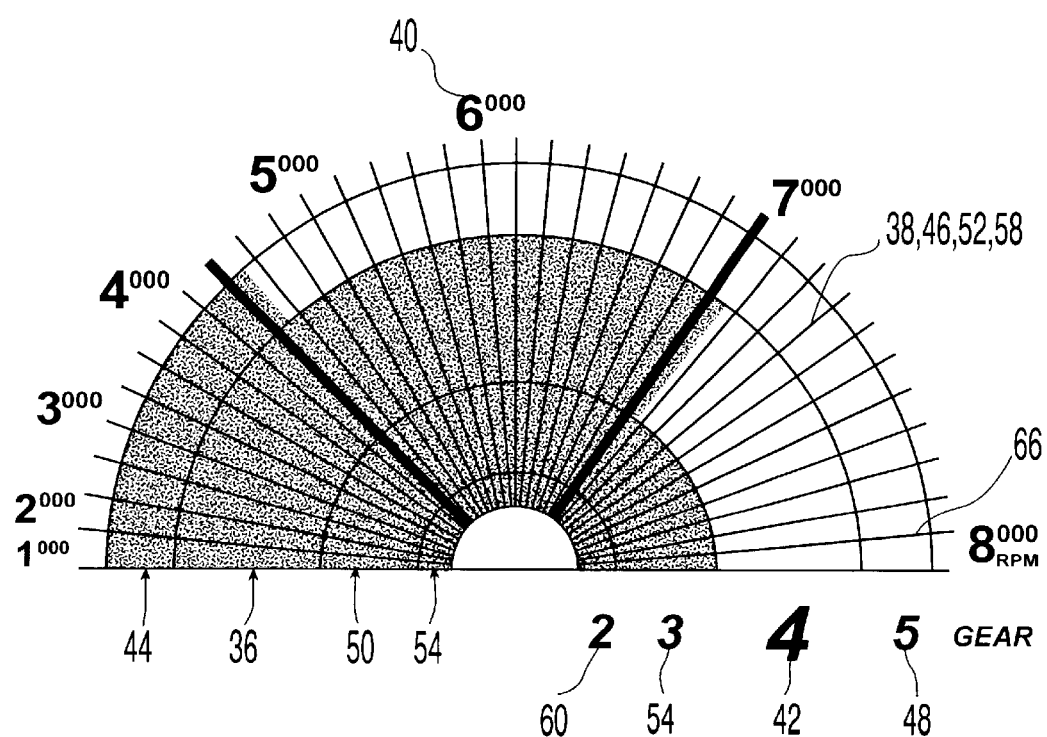
FIG. 7 is a front elevational view of the display of the tachometer of FIG. 1 according to a fourth embodiment of the present invention wherein the motor vehicle transmission is in fourth gear.

FIG. 7 illustrates a display 22 according to a fourth embodiment of the present invention which is substantially the same as the first to third embodiments except that coaxial circular bar graphs are utilized. It is noted that like reference numbers are utilized for like structure. The illustrated circular bar graphs are semicircles or half-circles oriented to show the top half of the circles. It is noted that the circular bar graphs alternatively can be full circles or any sized segments thereof. It is also noted that the semicircles, or other sized circle segments, alternatively can have other orientations such as the bottom half, the left half, the right half, or anything therebetween. The current rpm graph 36 is a circular bar graph with the gear number 42 located below the high rpm end of the graph 36. The first up-shift rpm graph 44 is a circular bar graph located coaxial with, adjacent to, and radially outward of the current rpm graph 36 and has the gear number 48 located below the high rpm end of the graph 44. The first down-shift rpm graph 50 is a circular bar graph located coaxial with, adjacent to, and radially inward of the current rpm graph 36 and has the gear number 54 located below the high rpm end of the graph 50. The second down-shift rpm graph 56 is a circular bar graph located coaxial with, adjacent to, and radially inward of the first down-shift rpm graph 50 and has the gear number 60 located below the high rpm end of the graph 50. The scale divisions 38, 46, 52, 58 are preferably connected as continuous radially extending lines. It is noted that while a single up-shift rpm graph 44 and two down-shift rpm graphs 50, 56 are utilized in the illustrated embodiment, lesser or greater numbers of each can alternatively be utilized within the scope of the present invention.

Figure 8:
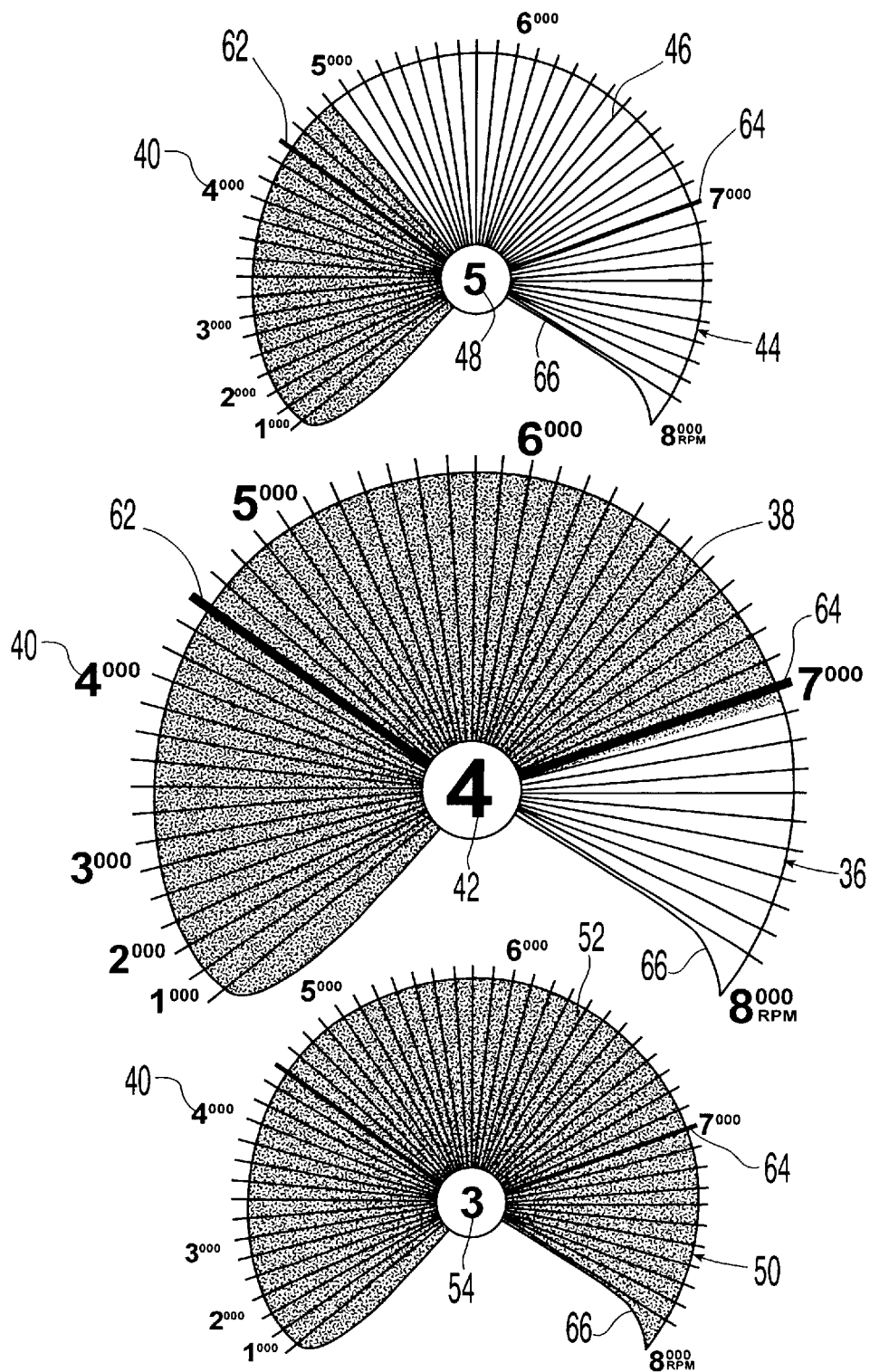
FIG. 8 is a front elevational view of the display of the tachometer of FIG. 1 according to a fifth embodiment of the present invention wherein the motor vehicle transmission is in fourth gear.

FIG. 8 illustrates a display 22 according to a fifth embodiment of the present invention which is substantially the same as the first to fourth embodiments except that separate spaced apart circular bar graphs are utilized. It is noted that like reference numbers are utilized for like structure. The current rpm graph 36 is a circular bar graph, extending about 180 degrees to form an upwardly extending circle segment, with the gear number 42 located at the center of the graph 36. It is noted that the circular bar graphs alternatively can be full circles or any segments thereof. It is also noted that the circle segments, alternatively can have other orientations such as the downward extending, the leftward extending, the rightward extending, or anything therebetween. The first up-shift rpm graph 44 is a circular bar graph located above and spaced apart from the current rpm graph 36 and has the gear number 48 located at the center of the graph 44. The first down-shift rpm graph 50 is a circular bar graph located below and spaced apart from the current rpm graph 36 and has the gear number 54 located at the center of the graph 50. The scale divisions 38, 46, 52, 58 are preferably separate radially extending lines. It is noted that while a single up-shift rpm graph 44 and a single down-shift rpm graph 50 are utilized in the illustrated embodiment, lesser or greater numbers of each can alternatively be utilized.

It should be appreciated that any of the features of the various disclosed embodiments can be utilized with any of the other various disclosed embodiments. For example, any of the first through fourth embodiments can have separate spaced-apart graphs as utilized by the fifth embodiment.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tachometer for a motor vehicle comprising, in combination:
    a display adapted to produce an observable indication of a current rpm value for a current gear and an observable indication of at least one predicted rpm value for a different gear which is a prediction of what the current rpm will become upon changing the current gear to the different gear;
    wherein the display is adapted to simultaneously produce the of observable indication of the current rpm value and the observable indication of the at least one predicted rpm value;
    wherein the current rpm value is different than the at least one predicted rpm value when the motor vehicle is moving and the current gear is different than the different gear;
    a controller operably connected to the display and adapted to provide signals representing the current rpm value for the current gear and the at least one predicted rpm value for the different gear to the display;
    at least one sensor operably connected to the controller and adapted to provide signals representing at least the current rpm and the current gear; and
    wherein the controller is adapted to determine the at least one predicted rpm value using predetermined performance information and the signals representing at least the current rpm and the current gear.

2. The tachometer according to claim 1, wherein the controller is adapted to calculate the at least one predicted rpm value with stored equations.

3. The tachometer according to claim 1, wherein the display is adapted to produce an observable indication of the current gear near the observable indication of the current rpm value and an observable indication of the different gear near the observable indication of the at least one predicted rpm value.

4. The tachometer according to claim 1, wherein the display is adapted to produce an observable indication of a power-peak rpm value.

5. The tachometer according to claim 4, wherein the display is adapted to produce an observable indication of a torque-peak rpm value.

6. The tachometer according to claim 4, wherein the display is adapted to change a magnitude of the power-peak rpm value during operation of the motor vehicle.

7. The tachometer according to claim 6, wherein the display is adapted to produce an observable indication of a torque-peak rpm value and to change a magnitude of the torque-peak rpm value during operation of the motor vehicle.

8. The tachometer according to claim 1, wherein the display is adapted to produce an observable indication of a torque-peak rpm value.

9. The tachometer according to claim 8, wherein the display is adapted to change a magnitude of the torque-peak rpm value during operation of the motor vehicle.

10. The tachometer according to claim 1, wherein the observable indication of the current rpm value is an arc-shaped bar graph.

11. The tachometer according to claim 10, wherein the arc-shaped bar graph has a height increasing from a low rpm end of the bar graph to a high rpm end of the bar graph.

12. The tachometer according to claim 10, wherein the observable indication of the at least one predicted rpm value is an arc-shaped bar graph adjacent the arc-shaped bar graph indicating the current rpm value and utilizing common scale divisions with the arc-shaped bar graph indicating the current rpm value.

13. The tachometer according to claim 12, wherein the arc-shaped bar graph indicating the current rpm value has a larger height than the bar graph indicating the at least one predicted rpm value at each scale division.

14. The tachometer according to claim 12, wherein the display is adapted to produce a numerical indication of the current gear at a high rpm end of the bar graph indicating the current rpm value and a numerical indication of the different gear at a high rpm end of the bar graph indicating the at least one predicted rpm value.

15. The tachometer according to claim 14, wherein the numerical indication of the current gear is larger than the numerical indication of the different gear.

16. The tachometer according to claim 12, wherein the arc-shaped bar graph indicating the at least one predicted rpm value is located below the arc-shaped bar graph indicating the current rpm value when the different gear is lower than the current gear and is located above the arc-shaped bar graph indicating the current rpm value when the different gear is higher than current gear.

17. The tachometer according to claim 10, wherein the display is adapted to produce an observable indication of a power-peak rpm value and the power-peak rpm value is located at a substantially vertical portion of the arc-shaped bar graph.

18. The tachometer according to claim 1, wherein the observable indication of the current rpm value is a vertical linear bar graph and the observable indication of the at least one predicted rpm value is a vertical linear bar graph adjacent the vertical bar graph indicating the current rpm value and utilizing common scale divisions with the vertical linear bar graph indicating the current rpm value.

19. The tachometer according to claim 1, wherein the observable indication of the current rpm value is a horizontal linear bar graph and the observable indication of the at least one predicted rpm value is a horizontal linear bar graph adjacent the horizontal bar graph indicating the current rpm value and utilizing common scale divisions with the horizontal linear bar graph indicating the current rpm value.

20. The tachometer according to claim 1, wherein the observable indication of the current rpm value is a circular bar graph.

21. The tachometer according to claim 20, wherein the observable indication of the at least one predicted rpm value is a circular bar graph coaxial with the circular bar graph indicating the current rpm value and utilizing common scale divisions with the circular bar graph indicating the current rpm value.

22. The tachometer according to claim 20, wherein the observable indication of the at least one predicted rpm value is a circular bar graph spaced apart from the circular bar graph indicating the current rpm value and having separate scale divisions from the circular bar graph indicating the current rpm value.

23. A motor vehicle comprising, in combination:
   a transmission having a current gear which is currently engaged and at least one different gear which is not currently engaged;
   a tachometer including a display adapted to produce an observable indication of a current rpm value for the current gear and an observable indication of a predicted rpm value for the different gear which is a prediction of what the current rpm will become upon changing the current gear to the different gear;
   wherein the display is adapted to simultaneously produce the of observable indication of the current rpm value and the observable indication of the predicted rpm value;
   wherein the current rpm value is different than the predicted rpm value when the motor vehicle is moving and the current gear is different than the different gear;
   a controller operably connected to the display and adapted to provide signals representing the current rpm value for the current gear and the predicted rpm value for the different gear to the display;
   at least one sensor operably connected to the controller and adapted to provide signals representing at least the current rpm and the current gear; and
   wherein the controller is adapted to determine the predicted rpm value using predetermined performance information and the signals representing at least the current rpm and the current gear.

24. The motor vehicle according to claim 23, wherein the controller is adapted to calculate the predicted rpm value with stored equations.

25. A method of providing rpm information comprising the steps of, in combination:
   producing an observable indication of a current rpm value for a current gear with a display;
   producing an observable indication of at least one predicted rpm value for a different gear which is a prediction of what the current rpm will become upon changing the current gear to the different gear with the display gear;
   wherein the of observable indication of the current rpm value and the observable indication of the at least one predicted rpm value are simultaneously produced;
   wherein the current rpm value is different than the at least one predicted rpm value when the motor vehicle is moving and the current gear is different than the different gear;
   providing signals representing the current rpm value for the current gear and the at least one predicted rpm value for the different gear from a controller to the display;
   providing signals representing at least the current rpm and the current gear from at least one sensor to the controller; and
   determining the at least one predicted rpm value using predetermined performance information and the signals representing at least the current rpm and the current gear.

26. The method according to claim 25, wherein the step of determining the at least one predicted rpm value includes calculating the at least one predicted rpm value with stored equations of the controller.

* * * * *